Oct. 8, 1963 W. V. HOLMES 3,106,411
TRAILER SKIRT
Filed Jan. 17, 1962

INVENTOR.
WILLIAM V. HOLMES
BY Richard von K. Bruns
Atty.

United States Patent Office 3,106,411
Patented Oct. 8, 1963

3,106,411
TRAILER SKIRT
William V. Holmes, 167 Anderegg Drive, Rome, N.Y.
Filed Jan. 17, 1962, Ser. No. 166,884
4 Claims. (Cl. 280—150)

This invention relates to a trailer skirt and more particularly to a wall structure for enclosing the space beneath the trailer, said structure including panels of rigid sheet material having telescopically adjustable connections with the trailer and the ground.

Wall structures for enclosing the space under buildings, such as trailers, which have their floors raised above the ground, have the double function of providing an insulating space beneath the floor during cold weather and providing a protected storage space beneath the building. Since one advantage of a trailer dwelling is its mobility, any structure for enclosing the space beneath the trailer should be easily attachable and removable, and, preferably, should not be unsightly.

The principal object of the invention, accordingly, is to provide a low-cost trailer skirt which is sturdy and weatherproof, and which may be easily and quickly installed and removed.

A further important object it to provide a removable wall for enclosing the space under a structure, the wall being of a material and appearance harmonizing with that of the structure.

A still further object is to provide a structure for enclosing the space beneath a trailer or other building raised above the ground, which structure is easily applied and is readily adaptable to compensate for irregularities in the ground without having weather-pervious and unsightly gaps and irregularities in the completed structure.

Other objects and advantages will become apparent from the following description taken in conjunction with the accompanying drawing in which.

Figure 1:
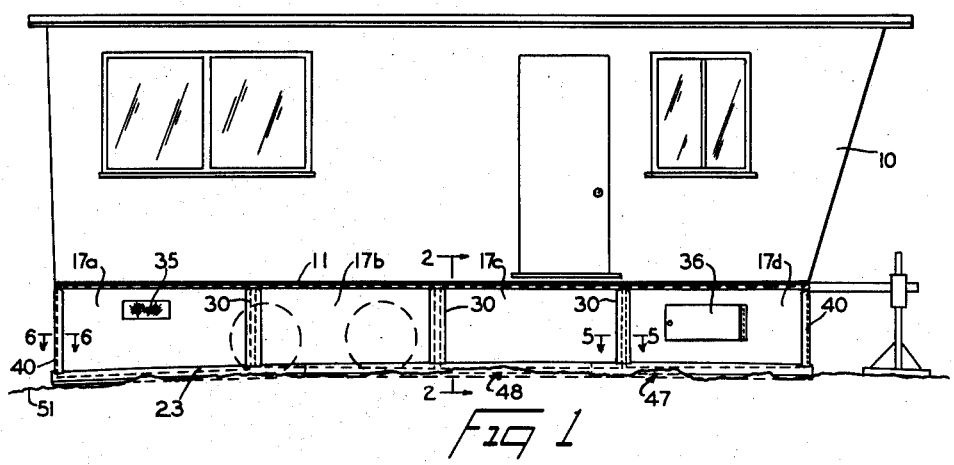
FIGURE 1 is a side elevational view of a trailer showing the space-enclosing structure according to the invention.

In the drawing a trailer 10 has a continuous top fastening strip or a series of strips 11 secured to its bottom surface by securing means such as the screws 12. The top or upper fastening strip 11 has a horizontally disposed securing flange 13 on the inward side thereof which is drilled at appropriate intervals for the screws 12. Outward of flange 13 the strip is bent sharply down to a reverse or 180 degree bend below the flange 13 to provide a first pendant fold 14. Outwardly of the fold 14 the strip has an oppositely facing reverse bend at substantially the level of the flange and a second pendant fold 15 similar to the first. Folds 14 and 15 are shaped to provide therebetween a downwardly opening slip joint groove 16 for receiving and gripping the upper edge of a panel 17 made of a single thickness of sheet metal or similar rigid sheet material.

Figure 2:
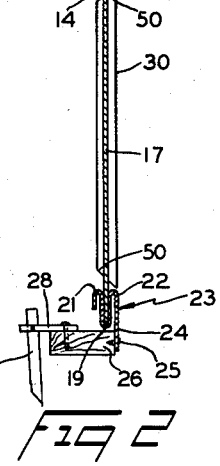
FIGURE 2 is an enlarged fragmentary transverse sectional view of the structure on the line 2—2 of FIG. 1.

Outward of the outer fold 15 the strip is bent again at substantially the level of flange 13 to provide an outwardly and downwardly sloping flange 18 which may have a bead 19 at its outer extremity. The strip 11 is secured to the trailer 10 so that the upper edge of flange 18 is somewhat inward of the edge of the bottom surface of the trailer and the remaining portion of flange 18 extends out beyond the sidewall of the trailer so as to act as a drip rail, see FIG. 2.

Along its bottom edge the panel 17 is received and gripped in an upwardly opening slip joint groove 19 formed between inner and outer upstanding folds 21 and 22 of the lower or bottom strip 23. The outer fold 22 below groove 19 is provided with a pendant securing flange 24 as an extension of the outer layer of the fold. Flange 24 is provided with holes at appropriate intervals for nails 25, FIG. 2, or other suitable fasteners, which are driven into the straight edge of a board 26, such as a 2 x 4, laid on the surface of the ground. The boards 26, in turn, may be secured to driven stakes 27 by means of wooden strips 28 nailed to the stake and board, or the flange 24 may be nailed directly to appropriately located stakes 27

It will be understood that the convoluted strips 11 and 23 extend continuously around the trailer and, according to the type of corners provided as hereinafter will appear, may each be one continuous strip or a continuous series of strips of considerably greater length than width. In the herein-described embodiment, the strips 11 and 23 are fabricated of sheet metal, but it will be apparent that they be made of plastic or any suitable resiliently rigid material.

Figure 5:
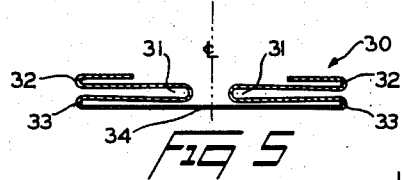
FIGURE 5 is a greatly enlarged sectional view of a panel connecting member on the line 5—5 of FIG. 1.
Figure 3:
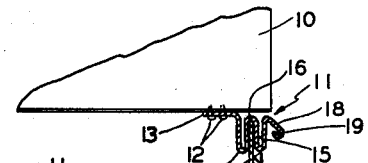
FIGURE 3 is a greatly enlarged sectional view of the top strip of FIG. 2.

Adjacent panels 17 are joined by connecting members 30 which extend vertically between the strips 11 and 23. The members 30 are also of metal or similar material and have a convoluted configuration as shown in FIG. 5, providing a slip joint groove 31 on either side of the member for receiving the lateral edges of the panels. Each groove 31 is formed between inner and outer folds 32 and 33, respectively, reversely bent at their extremities to present a rounded surface on either side of the groove for guiding the edge of the panel into the groove, and the outer layers of each outer fold 33 are connected across the outer face 34 of the member to form an unbroken surface on the exterior side of the wall.

In FIGURE 1, one sidewall of the trailer skirt is shown having the panels 17a, 17b, 17c and 17d. The panel 17a is provided with a screened ventilation window 35 to prevent the accumulation of moisture condensation in the enclosed space under the trailer. Alternatively, glazed windows may be provided in the panels to supply light if desired. Panel 17d is provided with a conventional hinged door 36 for access to the enclosed space and it will be understood that more than one panel may be so provided and the door or doors may be provided with appropriate locks.

Figure 6:
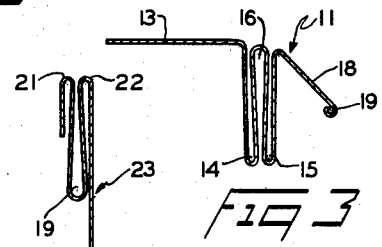
FIGURE 6 is a greatly enlarged sectional view of a corner panel connecting member on the line 6—6 of FIG. 1.
Figure 4:
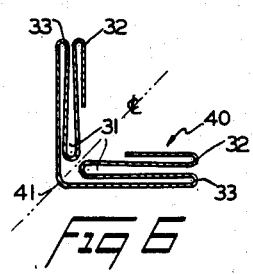
FIGURE 4 is a greatly enlarged sectional view of the bottom strip of FIG. 2.

At each corner shown in FIGURE 1, there is provided a corner connecting member 40, it being understood that the strips 11 and 23 are mitred at the corners of the trailer to provide a continuous unbroken series of strips around the trailer at the top and bottom of the panels 17. The members 40 have the same configuration as the members 30 except that the corner member is bent ninety degrees at 41 along the centerline, as shown in FIGURE 6 to provide slip joint grooves 31 for adjacent panels at the corner of the trailer.

Figure 7:
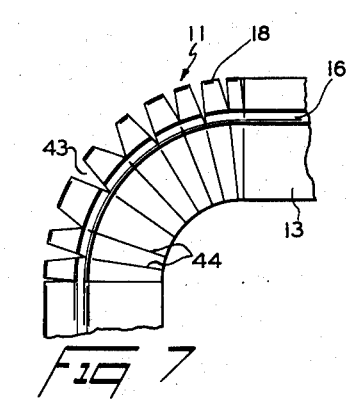
FIGURES 7 and 8 are enlarged top plan views of top and bottom strips respectively for an alternatively constructed corner.
Figure 8:
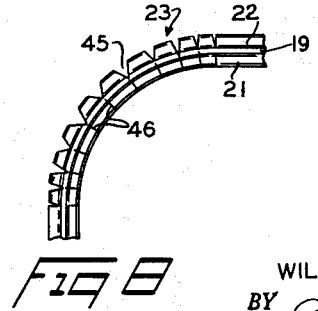

It will be understood that some trailers are provided with rounded corners, and a method of forming the skirt with rounded corners is illustrated in FIGURES 7 and 8. The top and bottom strips 11 and 23 are cut at angular intervals along the curve as shown to adapt the strip to be affixed to the trailer around the curved corner.

The outer flange 18 of the top strip is cut at intervals inwardly towards the slip joint groove 16 to form V-shaped notches at 43 when the curve is formed. The inner flange 13 has V-shaped notches cut at intervals as indicated at 44 so that the strip may be curved. Alternate cuts 43 and notches 44 are of slightly different lengths as shown so that the groove 16 may have a substantially uniform curvature.

The bottom strip is similarly cut at 45 and notched at 46 toward the center of the groove 19 so that it too may be affixed in a curve to members 26 at the corners.

It will be understood that for these curved corners a panel 17 is bent in a similar curve and used at each corner, members 30 being applied to the lateral edges of the curved panel at an appropriate distance from the corner.

In operation the top strip 11 is first applied so that the upper edge of the drip rail flange 18 is set back slightly from the outer surface of the trailer sidewall and with the flange 18 extending outward beyond the sidewall. It will be understood that the screws 12 may be appropriately spaced so as to engage cross members in the trailer floor or may be placed at regular intervals to engage the bottom surface of the trailer if it has an unbroken flat bottom surface. The strip 11 may thereafter remain permanently affixed to the trailer.

At each location where it is desired to have the trailer skirt enclosure installed, the 2 x 4 members 26 are first laid along the ground with a straight edge directly under the groove 16 of the top strip. Where the ground is uneven a shallow trench for the members 26 may be provided at each high spot as shown at 47 and 48 in FIGURE 1. Stakes 27 are then driven into the ground and the members 26 are secured by nailing the cross members 28 to the stakes and 2 x 4's as shown.

The upper edges of panels 17 are then inserted in groove 16 of the top strip and the connecting members 30 are installed between adjacent panels, the side edges of the panels being received in the grooves 31. If the trailer is located on sloping or uneven ground, the panels may be cut on the spot with varying heights so that the panels extend down substantially to the top of the members 26. The connecting members 30 may also be cut on the spot to the proper length, preferably with a mitre as shown at 50 in FIG. 2.

The bottom strip or strips 23 are then applied, the groove 19 engaging the bottom edges of the panels. The securing flange 24 is then nailed as at 25, at appropriate intervals, to the members 26.

It will be noted that the panel 17a, shown in FIG. 1, is of slightly greater height than the other panels and is non-rectangular so as to compensate for the unevenness of the ground, the ground line being indicated at 51. Panel 17d, however, is rectangular and the unevenness of the ground is compensated for by the panel 17d being received in the groove 19 of the bottom strip 23 to a greater depth at the left than at the right of the panel as indicated in FIGURE 1.

To remove the skirt 10 the nails 25 may be drawn and the parts removed in inverse order from that used in assembling them, or the members 26 may be knocked free from the inside from their connection to the stakes 27 and then moved bodily outward and, with the bottom strip 23 still attached, separated from the panels. The panels 17 and connecting members 30 can then be removed, the top strip 11 remaining attached to the trailer.

It will now be apparent that a trailer skirt, or wall structure, for enclosing the space under a trailer or other building has been provided which is easily and quickly assembled and removed, which can be made to harmonize with the appearance of the trailer, and which provides a complete, continuous, and strong wall structure for enclosing the space under the trailer. Moreover, since each panel 17 is received at its sides in the grooves 31, at its top in the groove 16 and at its bottom in the groove 19, the wall structure may be easily erected so as to compensate for any unevenness in the ground without laborious trenching and leveling of the ground-contacting members 26.

As will be apparent to those familiar with the art, the invention may be embodied in other specific forms without departing from the spirit or essential characteristics thereof. The embodiments disclosed therefore are to be considered in all respects as illustrative rather than restrictive, the scope of the invention being indicated by the appended claims.

What is claimed is:

1. A trailer skirt comprising: a plurality of sheet metal panels extending around the trailer substantially from the bottom of the trailer to the ground, a metal top strip of convoluted configuration having an inwardly projecting flange secured to the bottom surface of the trailer and extending around the edges thereof, said top strip having pendant inner and outer folds forming therebetween a slip joint groove for receiving the upper edges of said panels, a metal bottom strip of convoluted configuration having a downwardly projecting flange adapted to be secured adjacent the ground beneath said top strip, said bottom strip having upstanding inner and outer folds forming therebetween a slip joint groove for receiving the lower edges of said panels, and metal connecting members of convoluted configuration having on either lateral edge thereof inner and outer folds forming therebetween a slip joint groove for receiving a side edge of each pair of adjacent panels between said top and bottom strips.

2. The trailer skirt of claim 1 including straight-edged members positioned on the ground under said top strip and secured to stakes driven in the ground, the downwardly projecting flange of said bottom strip being secured to said straight-edged members.

3. The trailer skirt of claim 1 wherein said top strip outer fold is positioned inward of the edge of the trailer bottom surface, and outer fold having an outwardly and downwardly projecting drip flange projecting beyond said trailer edge.

4. A trailer skirt comprising a plurality of rigid panels extending substantially around the trailer from the floor of the trailer to the ground, a plurality of rigid top strips secured to the bottom surface of the trailer around the edges thereof, each of said top strips having a downwardly opening slip joint groove therealong for receiving the upper edges of said panels and an outwardly and downwardly projecting drip flange, a plurality of rigid bottom strips having depending portions adapted to be secured beneath said top strips to means anchored to the ground, each of said bottom strips having an upwardly opening slip joint groove therealong for receiving the lower edge of said panels, and rigid connecting members extending between said top and bottom strips and between adjacent panels, said connecting members having at each lateral edge thereof a laterally opening slip joint groove for receiving a side edge of a panel.

References Cited in the file of this patent
UNITED STATES PATENTS

| | | |
|---|---|---|
| 2,422,836 | Lariviere | June 24, 1947 |
| 2,777,710 | Panchesine | Jan. 15, 1957 |
| 2,961,255 | Trott | Nov. 22, 1960 |
| 2,988,380 | Puckett et al. | June 13, 1961 |
| 3,042,425 | Cathey et al. | July 3, 1962 |